US007960013B2

(12) United States Patent
Kira et al.

(10) Patent No.: US 7,960,013 B2
(45) Date of Patent: Jun. 14, 2011

(54) ILLUMINATED INDICATOR AND METHOD OF MANUFACTURING THE ILLUMINATED INDICATOR

(75) Inventors: Junichi Kira, Aichi-ken (JP); Yoshinobu Yokoyama, Aichi-ken (JP); Shosaku Watarai, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 912 days.

(21) Appl. No.: 11/448,131

(22) Filed: Jun. 7, 2006

(65) Prior Publication Data
US 2007/0177369 A1 Aug. 2, 2007

(30) Foreign Application Priority Data
Feb. 2, 2006 (JP) .................................. 2006-025386

(51) Int. Cl.
*G01D 11/28* (2006.01)
(52) U.S. Cl. ..................... 428/195.1; 428/203; 428/913; 428/913.3; 362/23
(58) Field of Classification Search .......................... None
See application file for complete search history.

(56) References Cited

U.S. PATENT DOCUMENTS

| 4,028,118 | A | * | 6/1977 | Nakasuji et al. | ............ | 106/31.19 |
| 4,579,770 | A | * | 4/1986 | Matsushita et al. | ............ | 428/213 |
| 5,005,949 | A | * | 4/1991 | Egawa et al. | ................. | 359/601 |
| 5,071,502 | A | * | 12/1991 | Hashimoto et al. | ............ | 156/234 |
| 5,164,443 | A | * | 11/1992 | Watanabe | ..................... | 524/495 |
| 5,420,097 | A | * | 5/1995 | Vanmaele et al. | ............ | 503/227 |
| 5,456,955 | A | * | 10/1995 | Muggli | ........................ | 427/555 |
| 5,477,430 | A | * | 12/1995 | LaRose | ........................... | 362/84 |
| 6,107,245 | A | * | 8/2000 | Kuga et al. | .................... | 503/227 |
| 6,180,048 | B1 | * | 1/2001 | Katori | ............................ | 264/400 |
| 6,326,569 | B1 | * | 12/2001 | Ardrey et al. | ................. | 200/314 |
| 6,762,381 | B2 | * | 7/2004 | Kunthady et al. | ............. | 200/512 |
| 2005/0118537 | A1 | * | 6/2005 | Lutz et al. | ..................... | 430/338 |
| 2005/0274594 | A1 | * | 12/2005 | Yang et al. | ..................... | 200/341 |

FOREIGN PATENT DOCUMENTS

| JP | 63-181213 A | 7/1988 |
| JP | 1-166984 A | 6/1989 |
| JP | 3-116085 A | 5/1991 |
| JP | 621124 | 3/1994 |

OTHER PUBLICATIONS http://www.cambridgeincolour.com/tutorials/color-perception.htm (Dec. 10, 2009).*
Notice of Reasons for Rejection issued in corresponding JP Application No. 2006-025386 on Feb. 8, 2011 and English Translation thereof.

* cited by examiner

*Primary Examiner* — Betelhem Shewareged
*Assistant Examiner* — Sathavaram I Reddy
(74) *Attorney, Agent, or Firm* — Roberts Mlotkowski Safran & Cole P.C.

(57) ABSTRACT

An illuminated indicator and a method of manufacturing the illuminated indicator that can make black the color of an indicator mark formed by irradiation with laser light are provided. In a shift position indicator panel, part of a light-blocking coating material layer and a design coating material layer is removed by irradiation with laser light, and part of an indicator coating material layer, which is created as a result of coating materials of three primary colors being mixed together, is exposed, whereby an indicator mark is formed. As long as the mixed coating material configuring the indicator coating material layer is made black by toning resulting from mixing coating materials of three primary colors, the color of the indicator mark also becomes black.

8 Claims, 2 Drawing Sheets

F I G. 2
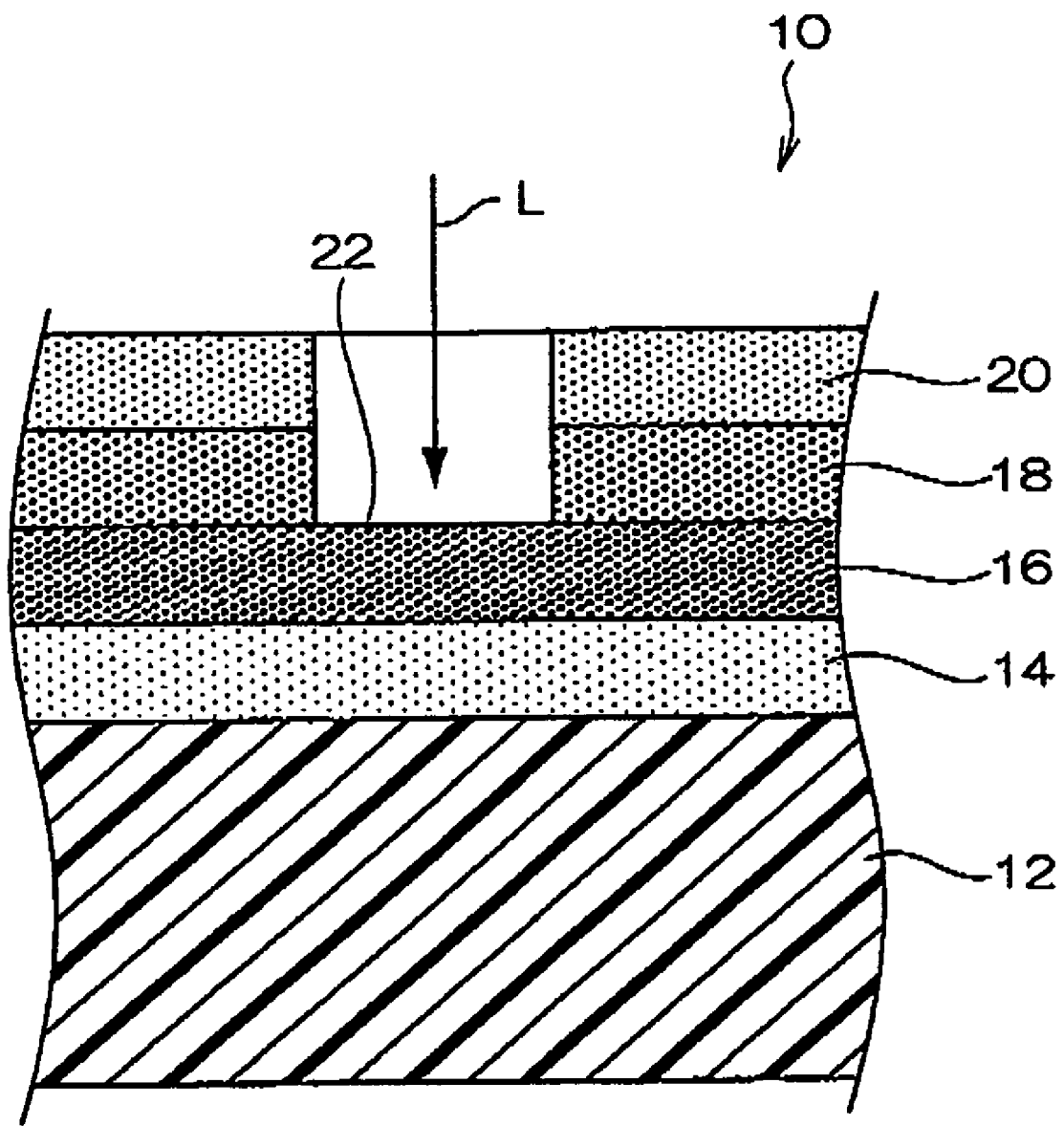

ILLUMINATED INDICATOR AND METHOD OF MANUFACTURING THE ILLUMINATED INDICATOR

CROSS REFERENCE TO RELATED APPLICATION

This application claims priority under 35 USC 119 from Japanese Patent Application No. 2006-025386, the disclosure of which is incorporated by reference herein.

BACKGROUND OF THE INVENTION

1. Field of the Invention

The present invention relates to an illuminated indicator including an indicator mark that is formed by laser marking and through which light is transmitted and to a method of manufacturing the illuminated indicator.

2. Description of the Related Art

An illuminated indicator is known where a white coating material that transmits light is applied to the surface of a transparent resin form to form an undercoat, a black coating material that includes carbon and blocks light is applied to the surface of the white coating material layer to form a topcoat, and the black coating material layer is irradiated with YAG laser fight to cause part of the black coating material layer to evaporate, whereby an indicator mark (e.g., a character design, etc.) is formed (e.g., see Japanese Patent Application Laid Open No. 1-166984). In this illuminated indicator, when light strikes the underside of the resin form, the light is transmitted through the resin form and the white coating material layer, whereby the white indicator mark is illuminated and the light is prevented from being transmitted through the portion other than the indicator mark as a result of being blocked by the black coating material layer. For this reason, the white indicator mark can be seen against the black background even in dark places.

Incidentally, in such illuminated indicators, design freedom is being improved by making the color of the indicator mark black and making the color of the entire illuminated indicator a color other than black. However, because the black coating material usually uses carbon as the pigment, the absorption rate of the laser energy is high. Consequently, when the black coating material is used for the undercoat, the undercoat coating material evaporates when it is irradiated with laser light. For this reason, when the color of the indicator mark is made black, this is done by release printing, which leads to a complication of the manufacturing process and a rise in the manufacturing cost.

SUMMARY OF THE INVENTION

The present invention has been made in view of the above circumstances and provides an illuminated indicator and a method of manufacturing the illuminated indicator that can make black the color of an indicator mark formed by irradiation with laser light.

A first aspect of the invention provides an illuminated indicator including: a transparent form; an indicator coating material layer that transmits light and is formed by applying, to a top side of the form, a mixed coating material in which coating materials of three primary colors are mixed together; a light-blocking coating material layer that blocks light and is formed as a result of a coating material including carbon being applied to the surface of the indicator coating material layer; and an indicator mark that is formed as a result of part of the light-blocking coating material layer being removed by irradiation with laser light such that part of the indicator coating material layer is exposed.

In the illuminated indicator of the first aspect, when light strikes the underside of the form, the light is transmitted through the form and the indicator coating material layer, whereby the indicator mark is illuminated at the top side of the form and the light is prevented from being transmitted through the portion other than the indicator mark as a result of being blocked by the light-blocking coating material layer. Here, in this illuminated indicator, part of the light-blocking coating material layer is removed by irradiation with laser light, and part of the indicator coating material layer, which is created as a result of coating materials of three primary colors being mixed together, is exposed, whereby the indicator mark is formed. Consequently, as long as the mixed coating material configuring the indicator coating material layer is made black by toning resulting from mixing coating materials of three primary colors, the color of the indicator mark also becomes black.

Further, a second aspect of the invention provides an illuminated indicator including: a transparent form; an indicator coating material layer that transmits light and is formed as a result of coating materials, each of which is a mutually different single color of three primary colors, being applied to a top side of the form; a light-blocking coating material layer that blocks light and is formed on the surface of the indicator coating material layer; and an indicator mark that is formed as a result of part of the light-blocking coating material layer being removed such that part of the indicator coating material layer is exposed.

Moreover, a third aspect of the invention provides a method of manufacturing an illuminated indicator, the method including: providing a transparent form; providing a mixed coating material in which coating materials of three primary colors are mixed together; applying the mixed coating material to a top side of the form to form an indicator coating material layer that transmits light; applying a coating material including carbon to the surface of the indicator coating material layer to form a light-blocking layer that blocks light; and irradiating the light-blocking coating material layer with laser light to remove part of the light-blocking coating material layer, such that part of the indicator coating material layer is exposed to form an indicator mark.

In the illuminated indicator of the third aspect, when light strikes the underside of the form, the light is transmitted through the form and the indicator coating material layer, whereby the indicator mark is illuminated at the top side of the form and the light is prevented from being transmitted through the portion other than the indicator mark as a result of being blocked by the light-blocking coating material layer. Here, in this illuminated indicator manufacturing method, part of the light-blocking coating material layer is removed by irradiation with laser light, and part of the indicator coating material layer, which is created as a result of coating materials of three primary colors being mixed together, is exposed, whereby the indicator mark is formed. Consequently, the mixed coating material configuring the indicator coating material layer is made black by toning resulting from mixing coating materials of three primary colors, whereby the color of the indicator mark can be made black.

As described above, with the illuminated indicator and the method of manufacturing the illuminated indicator pertaining to the present invention, the color of an indicator mark formed by irradiation with laser light can be made black.

BRIEF DESCRIPTION OF THE DRAWINGS

FIG. 2 is a cross-sectional view showing the configuration of an indicator mark of the shift position indicator mark pertaining to the embodiment of the present invention.

DETAILED DESCRIPTION OF THE INVENTION

Figure 1:
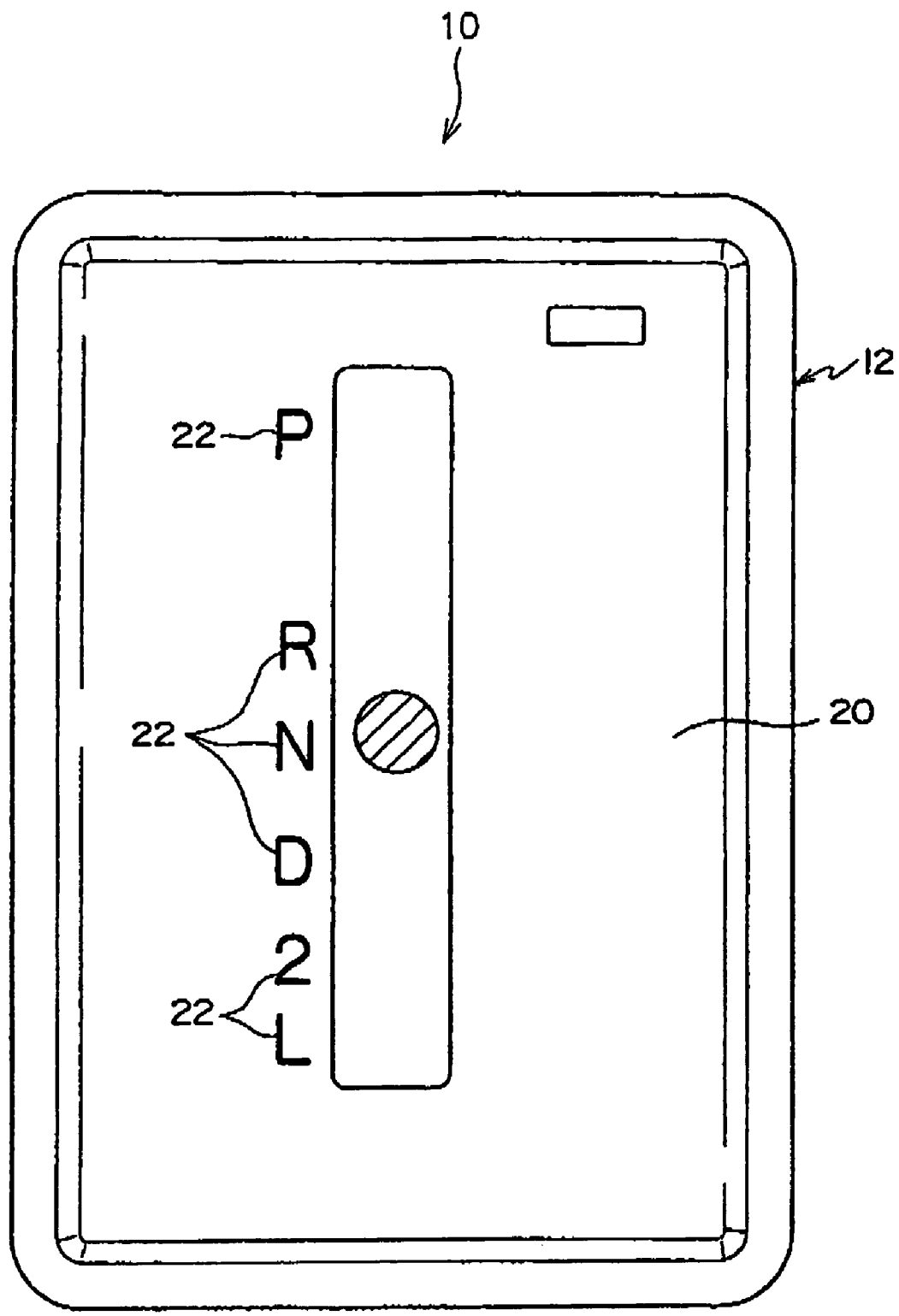
FIG. 1 is a plan view showing the configuration of a shift position indicator mark pertaining to an embodiment of the present invention.

In FIG. 1, the schematic configuration of a shift position indicator panel 10 serving as an illuminated indicator pertaining to an embodiment of the present invention is shown in plan view. Further, in FIG. 2, a partial configuration of the shift position indicator panel 10 is shown in cross section.

The shift position indicator panel 10 configures a vehicular shift lever device and includes a form 12 that is formed in a tabular shape by a colorless transparent resin material. A white coating material layer 14 that transmits light is formed on the surface of the form 12. The white coating material layer 14 is formed as a result of a white coating material made with a single-color pigment that does not include carbon being applied to the surface of the form 12.

An indicator coating material layer 16 that transmits light is formed on the surface of the white coating material layer 14. The indicator coating material layer 16 is formed by applying to the surface of the white coating material layer 14 a mixed coating material that is created as a result of coating materials of three primary colors (cyan, magenta, yellow) created with single-color pigments that do not include carbon being mixed together. Moreover, in the present embodiment, the coating materials of three primary colors are mixed together in the same amount each, so that the color of the indicator coating material layer 16 becomes black by subtractive color mixing.

A light-blocking coating material layer 18 that blocks light is formed on the surface of the indicator coating material layer 16. The light-blocking coating material layer 18 is formed as a result of a black coating material that includes carbon as a pigment being applied to the surface of the indicator coating material layer 16.

A design coating material layer 20 is formed on the surface of the light-blocking coating material layer 18. The design coating material layer 20 is formed as a result of a coating material of a design color (in the present embodiment, silver) of the shift position indicator panel 10 being applied to the surface of the light-blocking coating material layer 18.

It will be noted that, in the present embodiment, the film thickness of the white coating material layer 14 and the indicator coating material layer 16 is set to 5 µm to 15 µm, and the film thickness of the light-blocking coating material layer 18 and the design coating material layer 20 is set to 15 µm to 25 µm. Further, inks made by Seiko Advance, Ltd., are used as the coating materials.

Moreover, indicator marks (character designs) 22 of "P", "R", "N", "D", "2", and "L" are formed in the shift position indicator panel 10. These indicator marks 22 are formed as a result of part of the light-blocking coating material layer 18 and the design coating material layer 20 being removed (evaporated) by laser marking such that part of the indicator coating material layer 16 is exposed at the top side of the form 12. That is, when part of the design coating material layer 20 is irradiated with laser light L, that part of the design coating material layer 20 evaporates together with part of the design coating material layer 18 that includes carbon and whose absorption rate of the laser light L is high, but the indicator coating material layer 16 is not removed by laser irradiation because its absorption rate of the laser light L is low in comparison to that of the light blocking coating material layer, and the indicator coating material layer 16 is exposed at the top side (upper side in FIG. 2) of the form 12. Each of the indicator marks 22 is formed using this method. It will be noted that at the places where the indicator marks 22 of "R" and "N" are formed, coating material layers of amber and green that transmit light are formed in substantially the same film thickness as the indicator coating material layer 16 instead of the indicator coating material layer 16.

In the present embodiment, the Scriba II D40 model laser system made by Electrox is used for the laser marking, and the output of the laser is set to 60% to 70%. In this case, the output of the laser light becomes about 24 W to about 28 W because the maximum output of this laser system is 40 W.

Further, in the present embodiment, the frequency of the laser in the laser system is set in the vicinity of 50 kHz. In this case, damage to the indicator coating material layer 16 can be reduced because the laser light becomes fine and the energy per one time of irradiation with the laser light becomes low. It will be noted that when the frequency of the laser light is set in the vicinity of 10 kHz, for example, the laser light becomes rough and the energy per one time of irradiation with the laser light becomes high; thus, the damage to the indicator coating material layer 16 (non-carbon ink) becomes greater and it becomes easy for the result to not be good. Further, in the case of the above laser system, the time during which energy accumulates can be changed by Q Switch, and when the frequency of the laser light is 50 kHz, it is preferable to set the time during which energy accumulates to be short.

Further, in the present embodiment, the scanning speed of the laser light in the laser system (the speed at which the laser light is moved) is set to 600 mm/sec, the number of times the laser light is scanned (the number of times the laser light strikes) is set to two times per indicator mark 22, and the scanning direction of the laser light is set such that the laser light is scanned in the vertical direction the first time and scanned in the horizontal direction the second time. Laser unevenness can be eliminated by changing the scanning direction in this manner.

Further, in the present embodiment, the scanning pitch of the laser light in the laser system is set to 60 µm to 70 µm. When the output of the laser light in the laser system is set to 66% (i.e., about 25 W), the beam diameter becomes 70 µm to 80 µm, but by setting the scanning pitch within the above range, laser unevenness and over-burning can be suppressed.

Further, in the present embodiment, the method of scanning the laser light in the laser system is set to four steps comprising (1) marking just the outline, (2) vertically marking the inside of the outline, (3) marking just the outline, and (4) horizontally marking the inside of the outline. The method can also be set such that outline marking is not done, but the outer appearance becomes better when outline marking is done.

Next, the action of the present embodiment will be described.

In the shift position indicator panel 10 having the above-described configuration, when light strikes the underside of the form 12, the light is transmitted through the form 12, the white coating material layer 14 and the indication use coating material layer 16, whereby the indicator marks 22 are illuminated at the top side of the form 12 and the light is prevented from being transmitted through the portion other than the indicator marks 22 as a result of being blocked by the light-blocking coating material layer 18.

Here, in the shift position indicator panel 10, part of the light-blocking coating material layer 18 and the design coating material layer 20 is removed by irradiation with the laser light L, and part of the indicator coating material layer 16, which is created as a result of coating materials of three primary colors being mixed together, is exposed, whereby the indicator marks 22 are formed. Moreover, because the indicator coating material layer 16 is configured by a mixed coating material that is created as a result of coating materials of three primary colors being mixed together in the same amount each, its color becomes black due to subtractive color mixing, and the color of the indicator marks 22 also becomes black. For this reason, in the shift position indicator panel 10, the black indicator marks 22 can be seen against the silver background of the design coating material layer 20 formed on the surface, so that the shift position indicator panel 10 has an innovative outer appearance.

That is, in the shift position indicator panel 10 pertaining to the present embodiment, the indicator coating material layer 16 is formed by a mixed coating material that is created by mixing together coating materials of three primary colors that do not include carbon, whereby the color of the indicator marks 22 can be made black, and the indicator coating material layer 16 can be prevented or suppressed from evaporating when laser marking is implemented. Thus, troublesome steps as in release printing can be eliminated, and an improvement in the manufacturing efficiency and a reduction in the manufacturing cost can be achieved.

The shift position indicator panel 10 pertaining to the above-described embodiment is configured such that the white coating material layer 14 is intervened between the indicator coating material layer 16 and the form 12 (i.e., such that the mixed coating material configuring the indicator coating material layer 16 is indirectly applied to the surface of the form 12), but the present invention is not limited to this and may also be configured such that the white coating material layer 14 is omitted and the mixed coating material is directly applied to the surface of the form 12. That is, the white coating material layer 14 is disposed in order to control the transmittance and to ensure the coloration of the indicator coating material layer 16 and unillustrated coating material layers such as green and amber, and can be omitted because it is not a necessary constituent requirement.

Further, in the shift position indicator panel 10 pertaining to the above-described embodiment, the indicator coating material layer 16 is created as a result of coating materials of three primary colors (cyan, magenta, yellow) being mixed together, but the present invention is not limited to this. Instead of the indicator coating material layer 16, light-transmitting coating material layers of three colors in which cyan, magenta, and yellow are mutually independent may also be formed in layers between the form 12 and the light-blocking coating material layer 18. In this case also, the color of the indicator marks can be made black by subtractive color mixing.

Moreover, in the shift position indicator panel 10 pertaining to the above-described embodiment, the color of the indicator coating material layer 16 is made black by creating the mixed color material by mixing together coating materials of three primary colors in the same amount each, but the color of the indicator coating material layer pertaining to the present invention is not limited to black; it suffices for the indicator coating material layer to be one that is toned by mixing together coating materials of three primary colors.

What is claimed is:

1. An illuminated indicator comprising:
   a transparent form;
   an indicator coating material layer on a top side of the form that transmits laser light and is formed from a mixed coating material in which coating materials of three primary colors are mixed together such that said indicator coating material layer is black, wherein the three primary colors of the coating material remain unchanged by the transmission of laser light therethrough such that said indicator coating layer remains black;
   a light-blocking coating material layer that is removable by laser light and is formed as a result of a coating material including carbon being applied over a top surface of the indicator coating material layer; and
   an indicator mark that is black and is formed from the indicator coating material as a result of part of the light-blocking coating material layer being removed by irradiation with laser light such that part of the indicator coating material layer is exposed.

2. The illuminated indicator of claim 1, wherein
   the form includes, on the top side, a white coating material layer that transmits light, and
   the light-blocking coating material layer is formed over the surface of the white coating material layer.

3. The illuminated indicator of claim 1, wherein each of the coating materials of three primary colors comprises a single-color pigment that does not include carbon.

4. The illuminated indicator of claim 1, wherein the mixed coating material is configured as a result of coating materials of primary colors being mixed together in the same amount each.

5. The illuminated indicator of claim 1, wherein a design coating material layer comprising a coating material of a design color is formed on the surface of the light-blocking coating material layer.

6. An illuminated indicator comprising:
   a transparent form;
   an indicator coating material layer that transmits laser light and is formed from coating materials, each of which is a mutually different single color of three primary colors such that said indicator coating material layer is black, said indicator coating material being applied over a top side of the form, wherein the three primary colors of the coating material remain unchanged by the transmission of laser light therethrough such that said indicator coating layer remains black;
   a light-blocking coating material layer that includes carbon and is removable by laser light and is formed over the surface of the indicator coating material layer;
   a coating material of a design color covering a top surface of the light-blocking coating material layer which is removable by laser light and that visibly contrasts with the black color of the indicator coating, and
   an indicator mark that is formed from the indicator coating material as a result of part of the coating material of a design color and the light-blocking coating material layer being removed by laser radiation such that part of the indicator coating material layer is exposed.

7. The illuminated indicator of claim 6, wherein the indicator coating material layer includes a layer that is formed by applying, to the form, a mixed coating material in which the coating materials are mixed together.

8. The illuminated indicator of claim 6, wherein the indicator coating material layer includes a laminate layer that is configured by layers of the coating materials.

* * * * *